Figure 6:
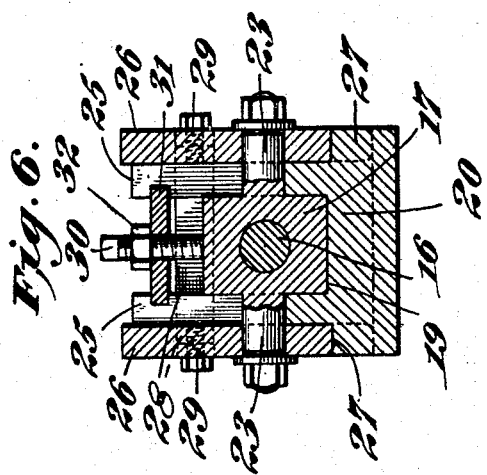

April 8, 1930.  J. J. KENNEDY  1,753,241
WELDING ROLL SCREW DOWN
Filed Dec. 11, 1926  2 Sheets-Sheet 1
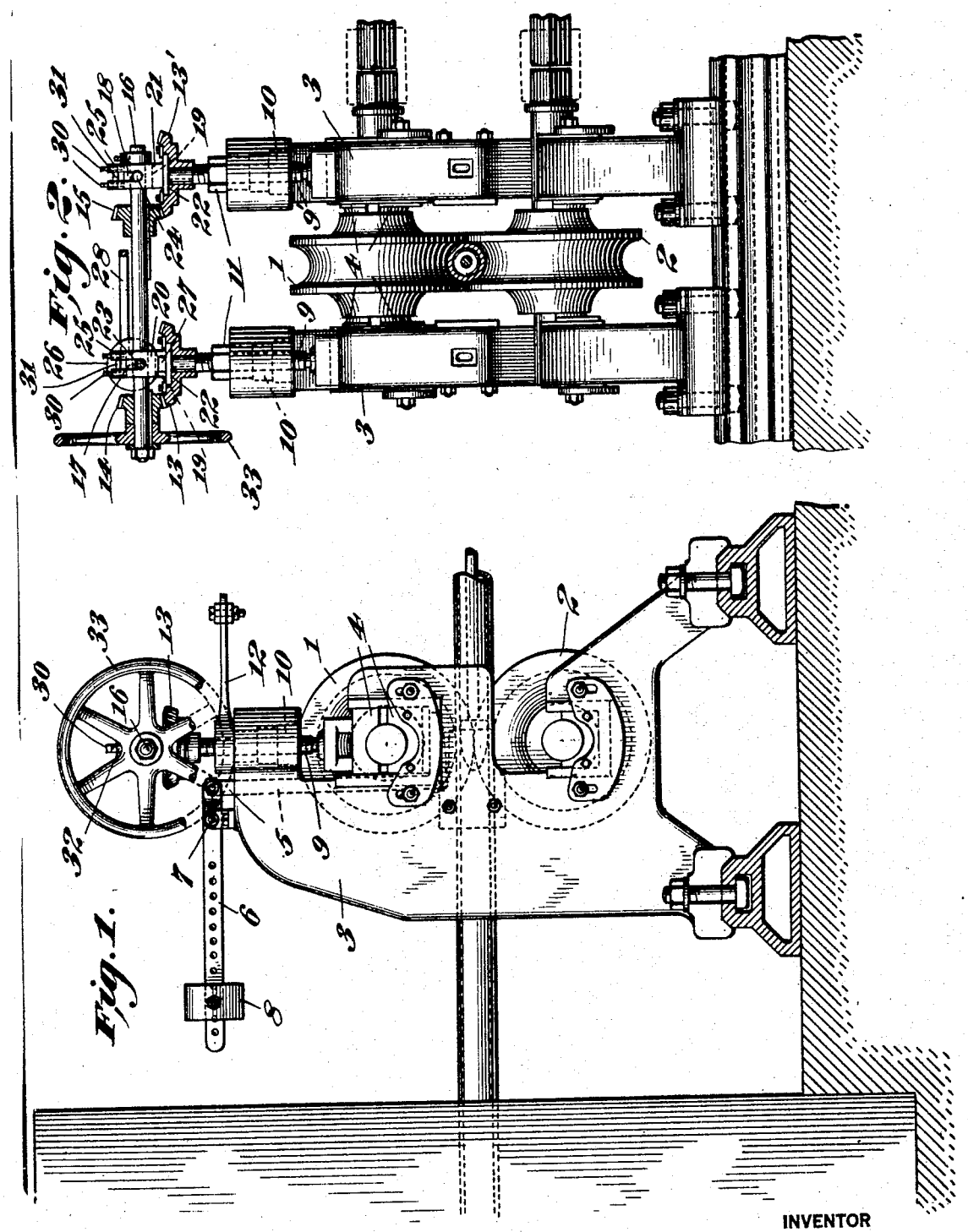
INVENTOR
John J. Kennedy
BY
R. S. A. Dougherty
ATTORNEY April 8, 1930. J. J. KENNEDY 1,753,241
WELDING ROLL SCREW DOWN
Filed Dec. 11, 1926  2 Sheets-Sheet 2

INVENTOR
John J. Kennedy
BY
R. S. A. Dougherty
ATTORNEY

Patented Apr. 8, 1930

1,753,241

UNITED STATES PATENT OFFICE

JOHN J. KENNEDY, OF POMEROY, PENNSYLVANIA, ASSIGNOR TO BETHLEHEM STEEL COMPANY

WELDING-ROLL SCREW DOWN

Application filed December 11, 1926. Serial No. 154,113.

My invention relates to the class of devices for adjusting the rolls of rolling mills and, more particularly, to those of welding mills, involving the use of welding rolls.

Heretofore, the usual means for adjusting the upper roll of a welding mill relative to the lower roll have consisted essentially of separate adjusting screws for the two ends of the upper roll, each screw being independently operated. I have discovered that substantial advantages in ease and effectiveness of adjustment may be secured by providing means for simultaneously actuating the adjusting screws. Accordingly, one of the objects of my invention is to secure such simultaneous adjustment.

Obviously, however, it is desirable at times to adjust the two ends to different degrees. Therefore, a further object of my invention is to provide means for effecting relative adjustment.

My invention consists essentially of welding roll adjusting means in which both ends of the roll may be simultaneously adjusted. It consists further in means whereby the ends may not only be simultaneously actuated but wherein one may be actuated independently of the other.

Figure 1:
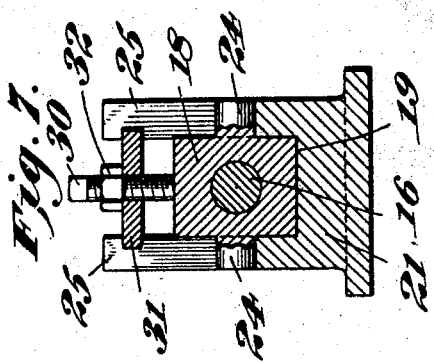
Figure 3:
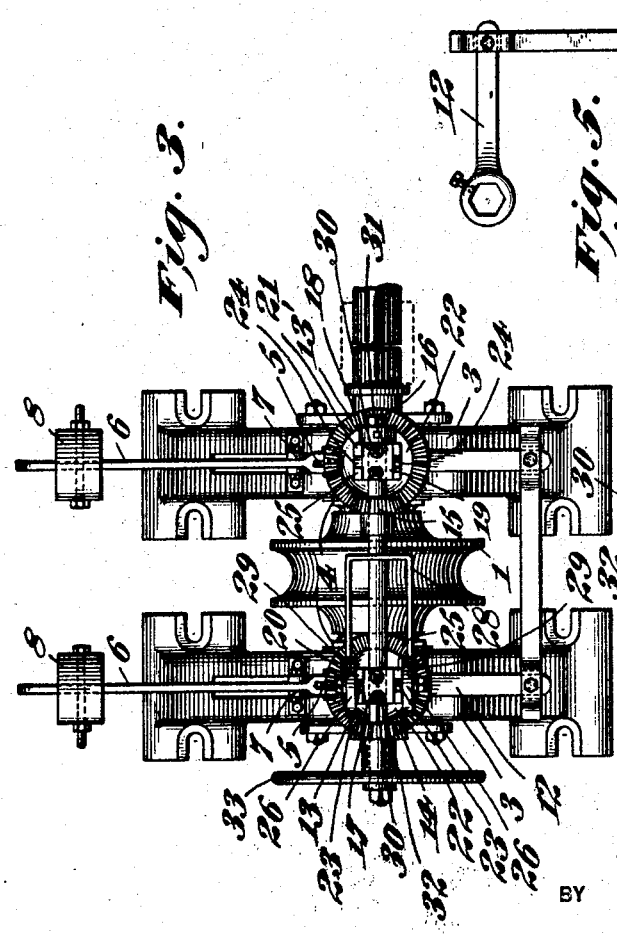
Figures 4, 5:
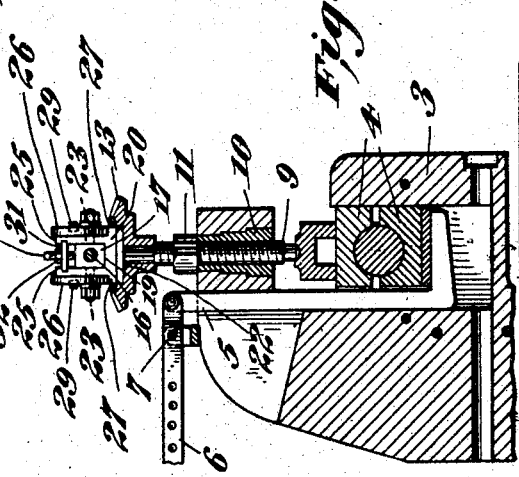

Referring to the drawings for a detailed description:

Fig. 1 is a side elevation;
Fig. 2 is an end elevation, portions thereof being in section;
Fig. 3 is a plan view;
Fig. 4 is a vertical section through the adjusting structure of a roll;
Fig. 5 is a plan of the combined wrench for locking the adjusting screws; and
Figs. 6 and 7 are sections through the structure for operating the adjusting screws.

Welding rolls 1 and 2, are mounted in journal blocks which slidably engage pedestal 3. The journal blocks for the upper roll, together with this roll itself, are yieldingly supported by links 5, pivotally attached to levers 6 which latter are pivoted to the pedestal at 7 and carry the weights 8, adjustably mounted thereon. Bearing against the upper journal blocks 4 are adjusting screws 9 and 9', having threaded engagement with the bushing 10 fixed in the pedestal. Lock nuts 11 are adapted to be actuated by the combined wrench 12 to lock these screws in the desired positions.

Fixed to the upper ends of the adjusting screws are bevel gears 13 and 13' adapted to engage bevel gears 14 and 15, keyed to the control shaft 16. This shaft is journaled in blocks 17 and 18 which fit in the squared sockets 19 of the supports 20 and 21 swivelly attached to the faces 22 of gears 13 and 13', and is adapted to be turned by wheel 33. Each bearing block is provided with trunnions 23 and 24 respectively, carried by the slots in the supports 20 and 21, these slots being the spaces between the upward extensions 25 of the supports. Rotatably and eccentrically secured to trunnions 23 are cams 26 which engage and are supported by lugs 27 on support 20. Handle 28 is secured at 29 to the cams, whereby they may be actuated to turn upon trunnions 23. The set screws 30 have threaded engagement with metal pieces 31 which fit tightly between the extensions 25. These set screws are adapted to engage the upper surface of blocks 17 and 18 and to be locked in the desired position by nuts 32.

The operation and use of the apparatus is more or less obvious. To simultaneously operate both of the adjusting screws 9 and 9', gears 14 and 15 should be in mesh with gears 13 and 13', (the position being that shown in Fig. 2). Lock nuts 11 being loosened by means of the wrench, the control shaft is turned by means of wheel 33 in the direction and to the extent desired.

To operate the adjusting screw 9' independently of screw 9, set screws 30 are released by loosening nuts 32. Then by means of handle 28, cams 26 are turned to lift block 17 and therewith one end of control shaft 16 sufficiently to disengage gears 14 and 13, the control shaft pivoting by means of trunnions 24, the displacement of the control shaft being insufficient to disengage gears 15 and 13'. Upon turning hand wheel 33, adjusting screw 9' is moved either up or down to the extent desired. The cam is then operated to reengage gears 13 and 14 after which set screws 30 are tightened.

If it is desired to adjust both ends of the upper roll, but the left hand end, (as viewed in Fig. 2), to an extent greater than the right hand, lock nuts 11 are loosened, as are also set screws 30, and the left hand end of the control shaft raised by means of the cams to disengage gears 13 and 14. Then wheel 33 is turned up to provide a sufficient clearance between adjusting screw 9' and block 4. After reengaging gears 13 and 14 and tightening set screws 30, the hand wheel is turned to adjust screw 9 to the extent desired, after which gears 13 and 14 are again disengaged to permit screw 9' to be independently adjusted to the desired degree.

Having thus described my invention what I desire to claim is as follows:

1. A screw down for a rolling mill comprising roll adjusting screws, separate transmission connections between the screws and a control shaft, the control shaft being journaled in bearings movably mounted on the adjusting screws, a cam rotatably mounted on one of said bearings, and engaging a support on one of the adjusting screws, whereby rotation of said cam elevates said bearing to disengage the control shaft and one of the adjusting screws.

2. A screw down for a mill, comprising roll adjusting screws, separate transmission connections between the screws and a control shaft rotatably mounted in blocks, said blocks being movably mounted in the slots of supports fixed to the adjusting screws, cams eccentrically mounted upon one of said blocks and engaging the supporting surface on an adjusting screw, and means for rotating the cams to elevate said blocks to disengage the control shaft from the last mentioned adjusting screw.

In testimony whereof I hereunto affix my signature.

JOHN J. KENNEDY.